United States Patent
Lin et al.

(10) Patent No.: US 11,227,558 B1
(45) Date of Patent: Jan. 18, 2022

(54) SUBPIXEL LAYOUT COMPENSATION TO CORRECT COLOR FRINGING ON AN ELECTRONIC DISPLAY

(71) Applicant: Apple Inc., Cupertino, CA (US)

(72) Inventors: Hung Sheng Lin, San Jose, CA (US); ByoungSuk Kim, Palo Alto, CA (US); Yi Huang, San Jose, CA (US); Jun Qi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/563,540

(22) Filed: Sep. 6, 2019

Related U.S. Application Data

(60) Provisional application No. 62/728,655, filed on Sep. 7, 2018.

(51) Int. Cl.
| | |
|---|---|
| *G09G 5/00* | (2006.01) |
| *G09G 3/36* | (2006.01) |
| *G09G 3/20* | (2006.01) |
| *G02F 1/1335* | (2006.01) |

(52) U.S. Cl.
CPC ..... *G09G 3/3607* (2013.01); *G02F 1/133514* (2013.01); *G09G 3/2003* (2013.01); *G09G 5/005* (2013.01); *G09G 2300/0452* (2013.01); *G09G 2320/0276* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 6,243,070 B1 | 6/2001 | Hill et al. | |
| 7,474,799 B2 | 1/2009 | Bassi et al. | |
| 8,933,959 B2 | 1/2015 | Brown Elliott et al. | |
| 2002/0140713 A1* | 10/2002 | Klompenhouwer | G09G 3/32 |
| | | | 345/690 |
| 2014/0104294 A1* | 4/2014 | Ben-Chorin | H04N 9/67 |
| | | | 345/589 |
| 2017/0092174 A1* | 3/2017 | Cote | G09G 3/20 |
| 2019/0385534 A1* | 12/2019 | Park | G09G 3/2074 |

* cited by examiner

*Primary Examiner* — Amr A Awad
*Assistant Examiner* — Donna V Bocar
(74) *Attorney, Agent, or Firm* — Fletcher Yoder, P.C.

(57) ABSTRACT

Systems and methods to compensate for color fringe visual artifacts due at least in part to subpixel locations on an electronic display are provided. An electronic device may include subpixel layout compensation circuitry (SLCC) and an electronic display. The SLCC may receive first image data and an indication of spatial positions of subpixels that make up pixels of an electronic display. The SLCC may generate second image data based at least in part on the first image data and the indication of the spatial positions of the subpixels. The second image data may reduce or eliminate a color fringe artifact that would otherwise occur without compensation.

20 Claims, 10 Drawing Sheets
(4 of 10 Drawing Sheet(s) Filed in Color)

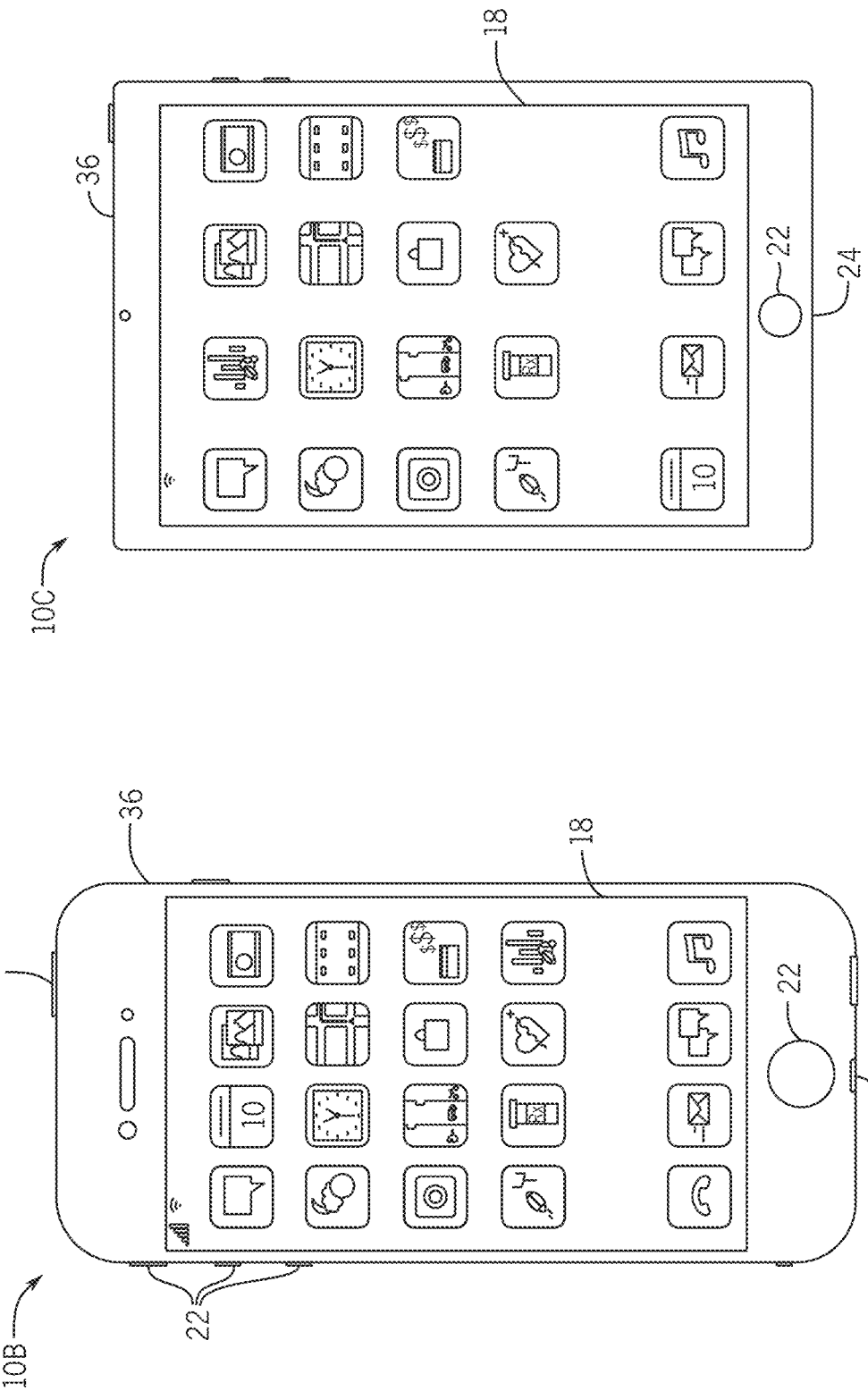

IDEAL

UNCORRECTED VERTICAL ORIENTATION

UNCORRECTED HORIZONTAL ORIENTATION

| | | |
|---|---|---|
| R | R_OUT(x, y) = ( <br> $WR_{11}$*(R_IN(x, y )^2.2) + $WR_{12}$*(R_IN(x+1, y )^2.2) + <br> $WR_{21}$*(R_IN(x, y+1)^2.2) + $WR_{22}$*(R_IN(x+1, y+1)^2.2))^(1/2.2) | WR = <br> [0.5 0.0; <br> 0.5 0.0] |
| G | G_OUT(x, y) = G_IN(x, y)    (EDGE SHARPNESS IS PRESERVED) | |
| B1 <br> x[0] = y[0] | B1_OUT(x, y) = ( <br> $WB1_{11}$*(B1_IN(x, y−1)^2.2) + $WB1_{12}$*(B1_IN(x+1, y−1)^2.2) + <br> $WB1_{21}$*(B1_IN(x, y )^2.2) + $WB1_{22}$*(B1_IN(x+1, y )^2.2))^(1/2.2) | WB1 = <br> [0.05 0.05; <br> 0.45 0.45] |
| B2 <br> x[0] ≠ y[0] | B2_OUT(x, y) = ( <br> $WB2_{11}$*(B2_IN(x, y−1)^2.2) + $WB2_{12}$*(B2_IN(x+1, y−1)^2.2) + <br> $WB2_{21}$*(B2_IN(x, y )^2.2) + $WB2_{22}$*(B2_IN(x+1, y )^2.2))^(1/2.2) | WB2 = <br> [0.25 0.25; <br> 0.25 0.25] |

SUBPIXEL LAYOUT COMPENSATION TO CORRECT COLOR FRINGING ON AN ELECTRONIC DISPLAY

CROSS-REFERENCE TO RELATED APPLICATIONS

This application claims priority to U.S. Provisional Patent Application No. 62/728,655, entitled "Subpixel Layout Compensation to Correct Color Fringing on an Electronic Display," filed on Sep. 7, 2018, which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure describes systems and methods for reducing or eliminating an artifact due to subpixel layout in an electronic display. For example, as described below, this disclosure relates to producing compensated image data based at least in part on relative positions of subpixels within pixels of an electronic display to reduce or eliminate certain color fringing visual artifacts on the electronic display. In particular, subpixel layout compensation circuitry, which may be implemented as hardware, software, or a combination of hardware and software, may reduce or eliminate color fringing artifacts due to the layout of subpixels within a pixel of an electronic display. Color fringing artifacts could arise because image data is often generated by image processing circuitry of an electronic device independent of the electronic display. The image data may have a format that assumes that all of the component colors of a pixel occupy the same spatial location in an array of image content described by the image data. In one example, the image data may have a red-green-blue (RGB) format in which pixels of the image data are composed of three color components: red, green, and blue. Any other suitable formats or electronic displays may be used, such as red-green-blue-white (RGBW) or red-green-blue-green (RGBG) formats and/or electronic displays.

If the image data could be displayed on an electronic display with pixels having three corresponding single-color subpixels that also occupied the exact same spatial location in the pixel, the image data would appear in the same way it was generated by the image processing circuitry. In reality, however, a pixel of an electronic display may be made up of single-color subpixels that occupy different spatial locations in the pixel. By way of example, a red subpixel may be centered on an upper left part of the pixel, a green subpixel may be centered on a lower left part of the pixel, and a blue subpixel may be centered on an upper right or lower right part of the pixel, though a vast number of different spatial arrangements are possible. As a consequence, image data that was generated under the assumption that the subpixels all occupy the same spatial location within the pixels could look differently than intended when it is displayed on an electronic display where subpixels occupy different spatial locations. For example, at a border between pixels programmed to display different colors (e.g., bright white pixels where RGB subpixels all emit at high levels, compared to dark black pixels where the RGB subpixels are all turned off), the subpixels emitting light at the edge of the border may become more visible, which may produce a color fringe effect. For example, if active red subpixels are located along the border, the border may take on a red fringe. By contrast, if active blue subpixels are located along the border, the border may take on a blue fringe.

Subpixel layout compensation circuitry may reduce or eliminate these color fringing artifacts through a process that includes resampling the image data to produce compensated image data. In particular, the subpixel layout compensation circuitry may receive image data that has been generated under the assumption that all subpixels of a pixel occupy the same spatial location within that pixel. The subpixel layout compensation circuitry may resample this image data to account for the offsets of each subpixel in each pixel in relation to some reference point in the pixel. The reference point may be any point in the pixel. For example, the center of one of the subpixels (e.g., red, green, or blue) may be defined as a reference point for the other subpixels (e.g., green and blue, red and blue, or green and red), which may enhance the resampling process and improve the efficiency of the subpixel layout compensation circuitry.

In some cases, the subpixel layout compensation circuitry may obtain the subpixel offset values used in the resampling process from storage in the electronic display itself. This may allow the subpixel layout compensation circuitry to be independent of the electronic display. That is, this may allow the same subpixel layout compensation circuitry to be used to compensate image data for any one of a variety of different electronic displays with different subpixel layouts. To further enhance the resampling process, the subpixel layout compensation circuitry may also upscale and/or anti-alias the image data before resampling to produce the compensated image data. The compensated image data may reduce or eliminate a color fringing artifact that might otherwise have appeared on the electronic display.

BRIEF DESCRIPTION OF THE DRAWINGS

Various aspects of this disclosure may be better understood upon reading the following detailed description and upon reference to the drawings in which:

The patent or application file contains at least one drawing executed in color. Copies of this patent or patent application publication with color drawing(s) will be provided by the Office upon request and payment of the necessary fee.

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

Figure 1:
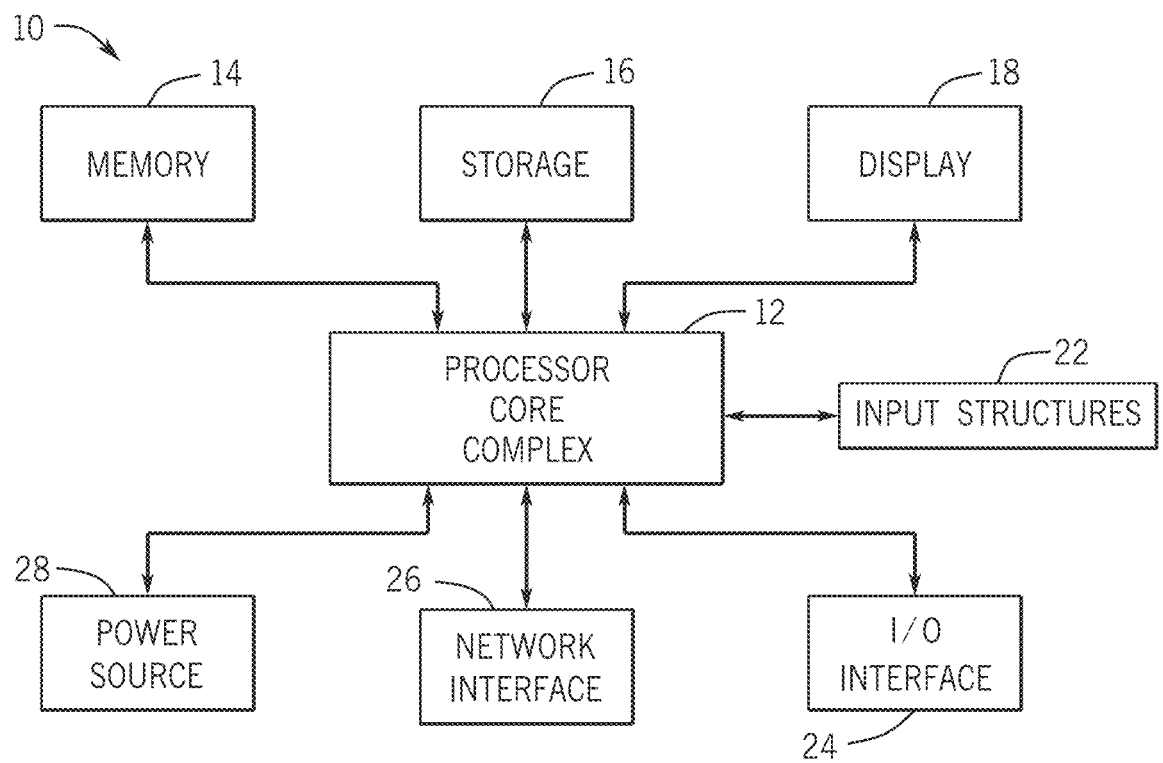
FIG. 1 is a schematic block diagram of an electronic device, in accordance with an embodiment.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are found in numerous electronic devices, from mobile phones to computers, televisions, automobile dashboards, and many more. Electronic displays contain pixels that can display a variety of different colors at varying levels of brightness. By programming the pixels of the electronic display with different colors or brightness, the electronic display can display a wide variety of images.

To display a variety of different colors, each pixel is actually made up of several single-color subpixels. In one example, each pixel may be made up of at least one red subpixel, at least one green subpixel, and at least one blue subpixel that can be independently controlled to emit different amounts of red, green, or blue light. An electronic display that uses red, green, and blue subpixels may be referred to as a red-green-blue (RGB) display, but there are many other display formats, such as red-green-blue-white (RGBW). By controlling the amount of single-color light emitted by the subpixels, the human eye may see any of a vast number of possible colors from each pixel. Most of the time, the human eye will perceive a composite color by integrating the single-color light from the subpixels. In certain situations, however, some of the individual color components of the subpixels may become apparent in an undesirable color fringe visual artifact.

Subpixel layout compensation circuitry may reduce or eliminate these color fringing artifacts through a process that includes resampling the image data to produce compensated image data. The subpixel layout compensation circuitry may receive image data that has been generated under the assumption that all subpixels of a pixel occupy the same spatial location within that pixel. The subpixel layout compensation circuitry may resample this image data and distribute the pixel values to account for the offsets of each subpixel in each pixel in relation to some reference point in the pixel. For example, the center of one of the subpixels (e.g., red, green, or blue) may be defined as a reference point for the other subpixels (e.g., green and blue, red and blue, or green and red), which may enhance the resampling process and improve the efficiency of the subpixel layout compensation circuitry.

In some cases, the subpixel layout compensation circuitry may obtain the subpixel offset values used in the resampling process from storage in the electronic display itself. This may allow the subpixel layout compensation circuitry to be independent of the electronic display. That is, this may allow the same subpixel layout compensation circuitry to be used to compensate image data for any one of a variety of different electronic displays with different subpixel layouts. To further enhance the resampling process, the subpixel layout compensation circuitry may also upscale and/or anti-alias the image data before resampling to produce the compensated image data. The compensated image data may reduce or eliminate a color fringing artifact that might otherwise have appeared on the electronic display.

While electronic displays having light emitting diodes (LEDs), such as organic light emitting diodes (OLEDs), as subpixels are described by way of example, any other suitable form of electronic display may be used in connection with the systems and methods of this disclosure. For example, digital micromirror device (DMD) or liquid crystal display (LCD) devices may also benefit from the systems and methods of this disclosure. Moreover, while OLED represents one type of LED that may be found in a self-emissive pixel, other types of LEDs may also be used.

Figure 2:
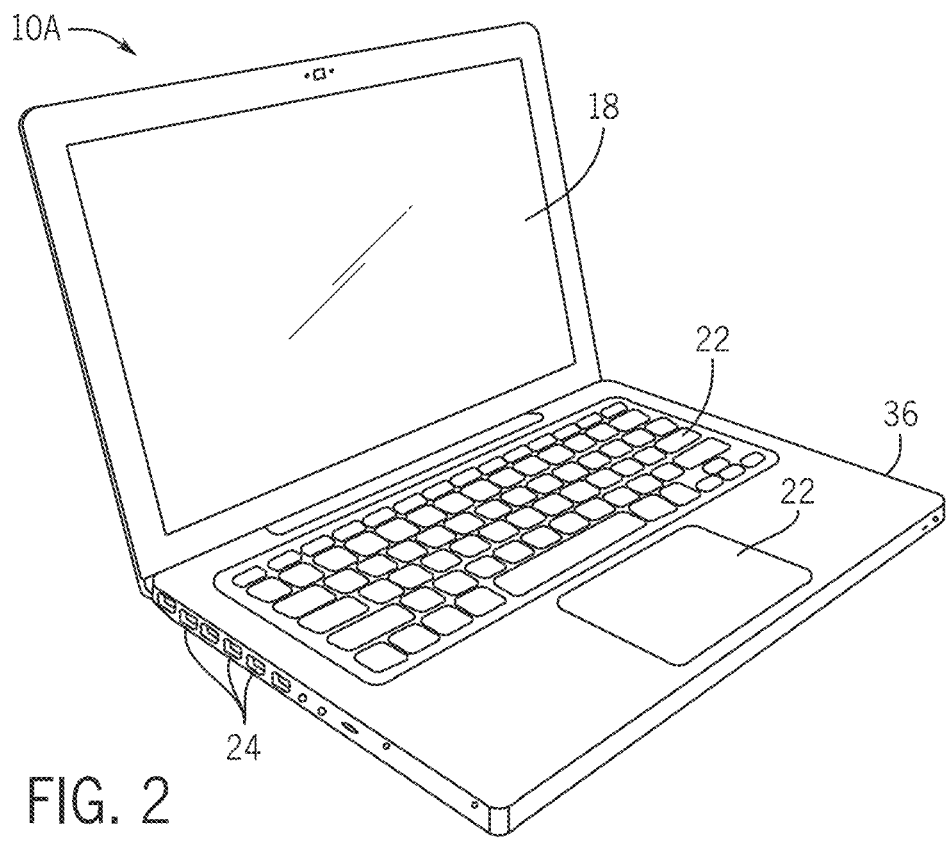
FIG. 2 is a perspective view of a notebook computer representing an embodiment of the electronic device of FIG. 1.
Figure 5:
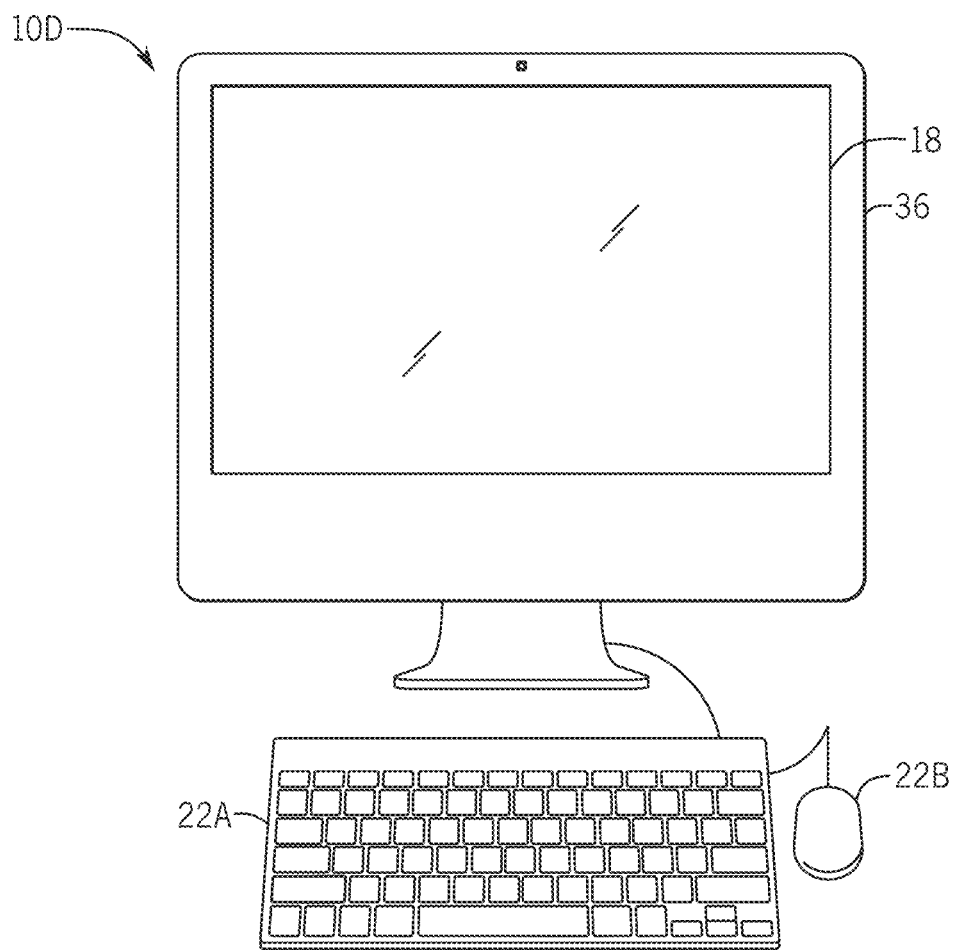
FIG. 5 is a front view of a desktop computer representing another embodiment of the electronic device of FIG. 1.
Figure 6:
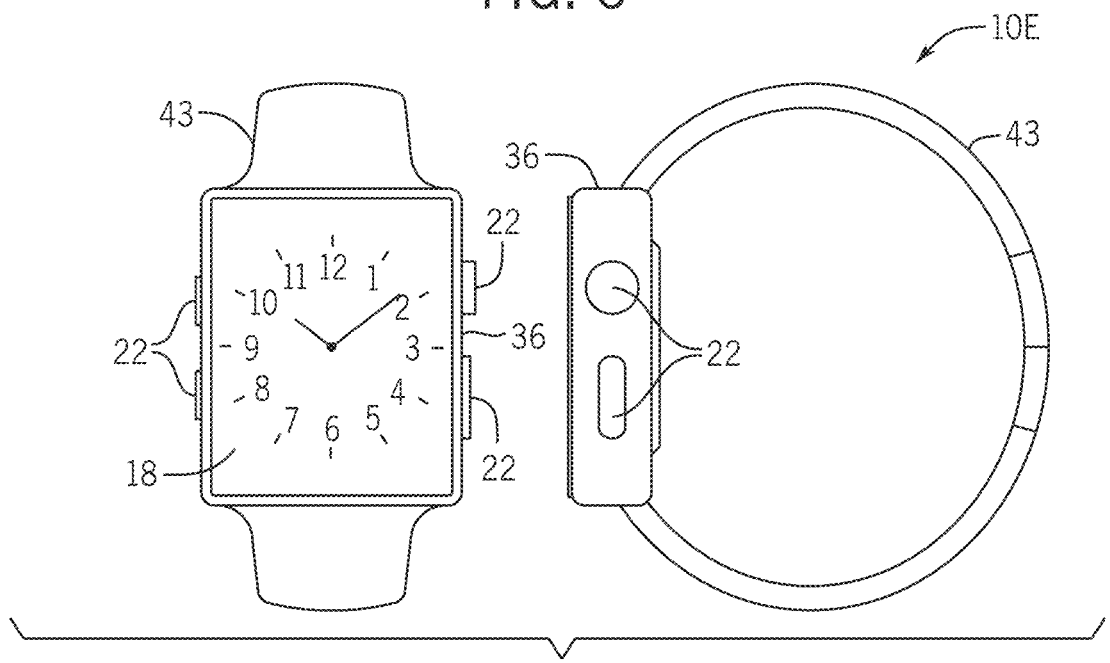
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, network interfaces 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as generating and/or processing image data for presentation on the electronic display 18. In some cases, the processor core complex 12 may be understood to include or interface with image processing circuitry that generates or prepares image data for presentation on the electronic display 18. Furthermore, the processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, or may be a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
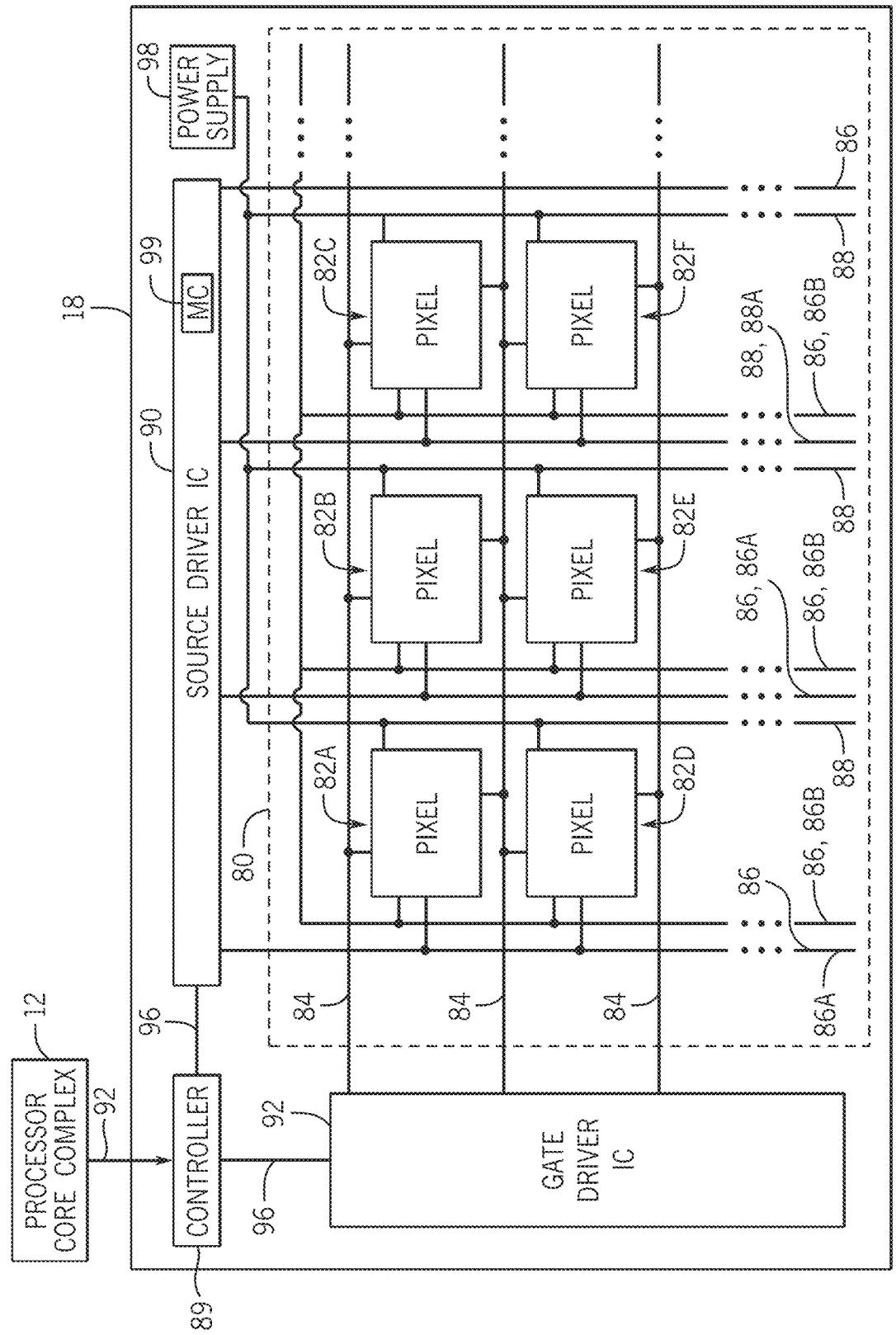
FIG. 7 is a circuit diagram of the electronic display of the electronic device of FIG. 1, in accordance with an embodiment.

The electronic display 18 for the electronic device 10 may include a matrix of pixels that contain light-emitting circuitry. Accordingly, FIG. 7 illustrates a circuit diagram including a portion of a matrix of pixels in an active area of the electronic display 18. As illustrated, the electronic display 18 may include a display panel 80. Moreover, the display panel 80 may include multiple unit pixels 82 (here, six unit pixels 82A, 82B, 82C, 82D, 82E, and 82F are shown) arranged as an array or matrix defining multiple rows and columns of the unit pixels 82 that collectively form a viewable region of the electronic display 18, in which an image may be displayed. In such an array, each unit pixel 82 may be defined by the intersection of rows and columns, represented here by the illustrated gate lines 84 (also referred to as "scanning lines") and data lines 86 (also referred to as "source lines"), respectively. Additionally, power supply lines 88 may provide power to each of the unit pixels 82 (e.g., from power supply 98). The unit pixels 82 may include, for example, a thin film transistor (TFT) coupled to a self-emissive pixel, such as an OLED, whereby the TFT may be a driving TFT that facilitates control of the luminance of a display pixel 82 by controlling a magnitude of supply current flowing into the OLED of the display pixel 82 or a TFT that controls luminance of a display pixel by controlling the operation of a liquid crystal.

Although only six unit pixels 82, referred to individually by reference numbers 82A-82F, respectively, are shown, it should be understood that in an actual implementation, each data line 86 and gate line 84 may include hundreds or even thousands of such unit pixels 82. By way of example, in a color display panel 80 having a display resolution of 1024× 768, each data line 86, which may define a column of the pixel array, may include 768 unit pixels, while each gate line 84, which may define a row of the pixel array, may include 1024 groups of unit pixels with each group including a red, blue, and green pixel, thus totaling 3072 unit pixels per gate line 84. It should be readily understood, however, that each row or column of the pixel array any suitable number of unit pixels, which could include many more pixels than 1024 or 768. In the presently illustrated example, the unit pixels 82 may represent a group of pixels having a red pixel (82A), a green pixel (82B), and a blue pixel (82C). The group of unit pixels 82D, 82E, and 82F may be arranged in a similar manner. Additionally, in the industry, it is also common for the term "pixel" to refer to a group of adjacent different-colored pixels (e.g., a red pixel, blue pixel, and green pixel), with each of the individual colored pixels in the group being referred to as a "subpixel." In some cases, however, the term "pixel" refers generally to each subpixel depending on the context of the use of this term. For example, when the electronic display 18 is an RGB display, the pixels 82 may be subpixels that are red, green, or blue. As another example, when the electronic display is an RGBW display, the pixels 82 may be subpixels that are red, green, blue, or white.

As illustrated, the electronic display 18 may include an array of pixels 82 (e.g., self-emissive pixels). The electronic display may include any suitable circuitry to drive the pixels 82. In the example of FIG. 7, the electronic display 18 includes a controller 89, a source driver integrated circuit (IC) 90, and a gate driver IC 92. The source driver IC 90 and gate driver IC 92 may drive individual of the self-emissive pixels 82. In some embodiments, the source driver IC 90 and the gate driver IC 92 may include multiple channels for independently driving multiple of the self-emissive pixel 82. Each of the pixels 82 may include any suitable light-emitting element, such as a LED, one example of which is an OLED. However, any other suitable type of pixel, including non-self-emissive pixels (e.g., liquid crystal, digital micromirror) may also be utilized.

The controller 89, which may include a chip, such as a processor or application specific integrated circuit (ASIC), that controls various aspects (e.g., operation) of the electronic display 18 and/or the display panel 80. For instance, the controller 89 may receive image data 94 from the processor core complex 12 indicative of light intensities for the light outputs for the pixels 82. In some embodiments, the controller 89 may be coupled to the local memory 14 and retrieve the image data 74 from the local memory 14. The controller 89 may control the pixels 82 by using control signals to control elements of the pixels 82. For instance, the pixels 82 may include any suitable controllable element, such as a transistor, one example of which is a MOSFET. The pixels 82, which may be self-emissive, may include any suitable controllable element, such as a transistor, one example of which is a MOSFET. However, any other suitable type of controllable elements, including thin film transistors (TFTs), p-type and/or n-type MOSFETs, and other transistor types, may also be used. The controller 89 may control elements of the pixels 82 via the source driver IC 70 and the gate driver IC 92. For example, the controller 89 may send signals to the source driver IC 90, which may send signals (e.g., timing information/image signals 96) to the pixels 82. The gate driver IC 92 may provide/remove gate activation signals to activate/deactivate rows of unit pixels 82 via the gate lines 84 based on timing information/image signals 96 received from the controller 89.

In some embodiments, the controller 89 may be included in the source driver IC 90. Additionally, the controller 89 or source driver IC 90 may include a timing controller (TCON) that determines and sends the timing information/image signals 96 to the gate driver IC 92 to facilitate activation and deactivation of individual rows of unit pixels 82. In other embodiments, timing information may be provided to the gate driver IC 92 in some other manner (e.g., using a controller 99 that is separate from or integrated within the source driver IC 90). Further, while FIG. 7 depicts only a controller 89 and a single source driver IC 90, it should be appreciated that other embodiments may utilize multiple controllers 69 and/or multiple source driver ICs 70 to provide timing information/image signals 96 to the unit pixels 82. For example, additional embodiments may include multiple controller 89 and/or multiple source driver ICs 70 disposed along one or more edges of the display panel 80, with each controller 89 and/or source driver IC 90 being configured to control a subset of the data lines 86 and/or gate lines 84. Furthermore, in other embodiments, the controller 89 may be located outside of the electronic display 18. For example, the controller 89 may be located in the processor core complex 12 in some embodiments.

The intensities of each pixel 62 may be defined by corresponding image data that defines particular gray levels for each of the pixels 62 to emit light. A gray level indicates a value between a minimum and a maximum range, for example, 0 to 255, corresponding to a minimum and maximum range of light emission. Causing the pixels 62 to emit light according to the different gray levels causes an image to appear on the electronic display 18. In this way, a first brightness level of light (e.g., at a first luminosity and defined by a gray level) may emit from a pixel 62 in response to a first value of the image data and the pixel 62 may emit at a second brightness level of light (e.g., at a first luminosity) in response to a second value of the image data. Thus, image data may create a perceivable image output by indicating light intensities to be generated via a programmed data signal to be applied to individual pixels 62.

The controller 89 may retrieve image data stored in the local memory 14 or storage main memory storage device 16 indicative of various light intensities. In some embodiments, the processor core complex 12 may provide image data directly to the controller 89. The controller 89 may control the pixels 82 by using control signals to control elements of the pixels 82. The pixels 82 may include any suitable controllable element, such as a transistor, one example of which is a metal-oxide-semiconductor field-effect transistor (MOSFET). However, any other suitable type of controllable elements, including thin film transistors (TFTs), p-type and/or n-type MOSFETs, and other transistor types, may also be used.

Figure 8:
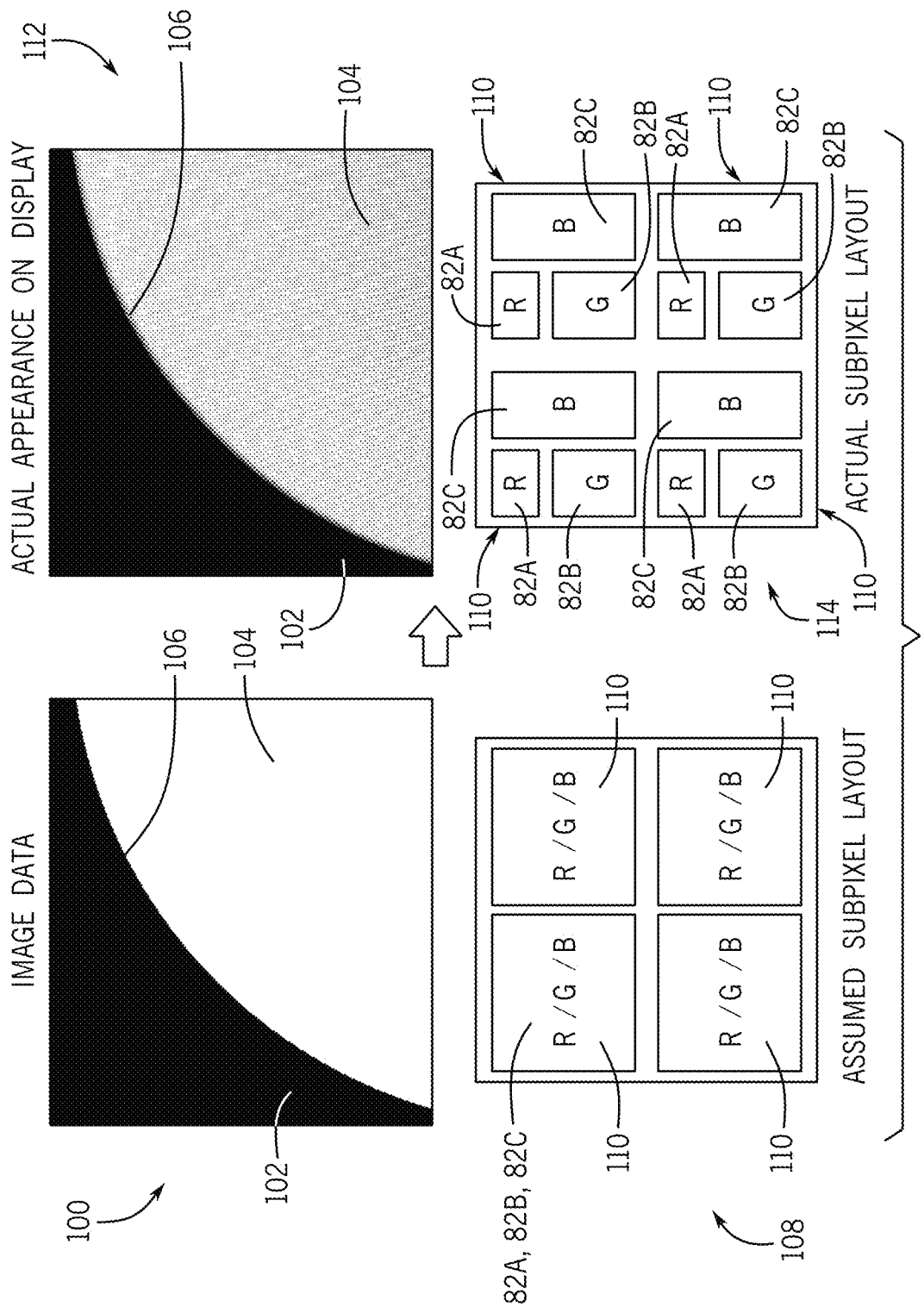
FIG. 8 is a diagram comparing image data generated under the assumption that subpixels occupy the same spatial location in each pixel, compared to an actual appearance of the image data when programmed on an actual electronic display where subpixels occupy different spatial locations in each pixel.

The electronic display 18 may display image data that is generated by the processor core complex 12 and/or other processing circuitry (e.g., image processing circuitry). As shown in FIG. 8, image data 100 is shown to have been rendered to include a black region 102 and a white region 104. A border 106 represents an interface between the black region 102 and the white region 104. The image data 100 may be generally produced by the processor core complex 12 and/or other processing circuitry using an assumed subpixel layout 108 whereby pixels 110 include three color channels that occupy the same location in the pixels 110. Indeed, the image data 100 may be visualized as a two-dimensional array of color information for each of the pixels 110. In an RGB format, the image data 100 may include red, green, and blue color channels for each of the pixels 110. In an electronic display, the individual color channels (e.g., red, green, and blue) of the image data 100 may be displayed on single-color subpixels 82 (e.g., subpixels 82A (red), 82B (green), and 82C (blue)). In the assumed subpixel layout 108, the set of single-color subpixels 82 (e.g., subpixels 82A (red), 82B (green), and 82C (blue)) may be visualized as occupying the same spatial location in each pixel 110.

In many cases, image data 100 generated according to the assumed subpixel layout 108 may produce a sufficiently satisfactory image when the image data 100 is displayed on an electronic display. For example, if the subpixels 82 of the electronic display are sufficiently close to one another, the subpixels 82 of that electronic display may produce an image that resembles the image data 100 that was produced based on the assumed subpixel layout 108.

In other cases, however, displaying the image data 100 on an electronic display may produce an actual image 112 with a color fringing effect along the border 106 between the black region 102 and the white region 104. The color fringing effect may be caused by the spatial arrangement of subpixels 82 in an actual subpixel layout 114 of the electronic display. As shown in the example actual subpixel layout 114 of FIG. 8, an area associated with each pixel 110 may contain a red subpixel 82A located in an upper left corner, a green subpixel 82B located in a lower left corner, and a blue subpixel 82C located in a center right position. These subpixels 82A, 82B, and 82C do not, therefore, occupy the exact same spatial location for each pixel 110, as assumed in the assumed subpixel layout 108. Because the subpixels 82A, 82B, and 82C associated with each pixel 110 are actually offset from one another, it is possible that certain individual colors emitted by the subpixels 82A, 82B, and 82C may not be seen by the human eye as belonging to the pixel 110 with which they are associated.

By way of example, consider the actual image 112 shown in FIG. 8. Here, the black region 102 of the actual image 112 is caused by turning off the red subpixels 82A, the green subpixels 82B, and the blue subpixels 82C of the electronic display 18 to produce an absence of light. By contrast, the white region 104 of the actual image 112 is caused by emitting light from the red subpixels 82A, the green subpixels 82B, and the blue subpixels 82C to collectively produce the color white as the human eye integrates these three primary colors. However, the border 106 between the black region 102 and the white region 104 may be susceptible to being seen by the human eye as having a red color fringe. Indeed, at the border 106, the human eye may integrate the light from the red subpixels 82A of the white region 104, which are on, with the absence of light from the green subpixels 82B and blue subpixels 82C of the black region 102, which are off. As a consequence, the actual image 112 may not appear to be strictly composed of a black region 102 and a white region 104, as defined by the image data 100. Instead, the border 106 of the actual image 112 may be interpreted by the human eye to be red.

Since such color fringing artifacts may be due to the subpixel layout of the pixels of an electronic display, the prevalence and color of the color fringing artifacts may vary depending on the orientation of the electronic display. FIGS.

Figure 9:
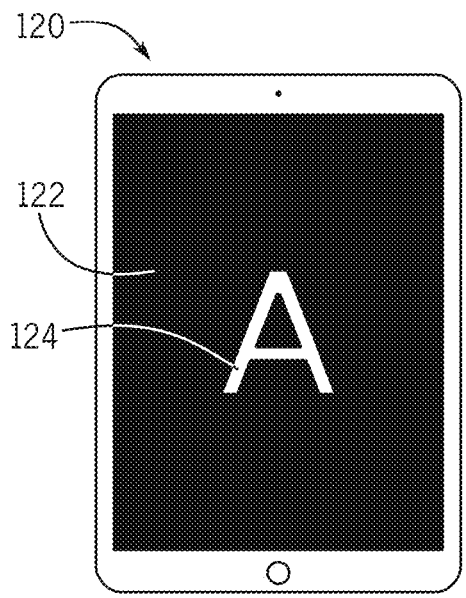
FIG. 9 is an example of an ideal appearance of an image displayed on an electronic display, in accordance with an embodiment.
Figure 10:
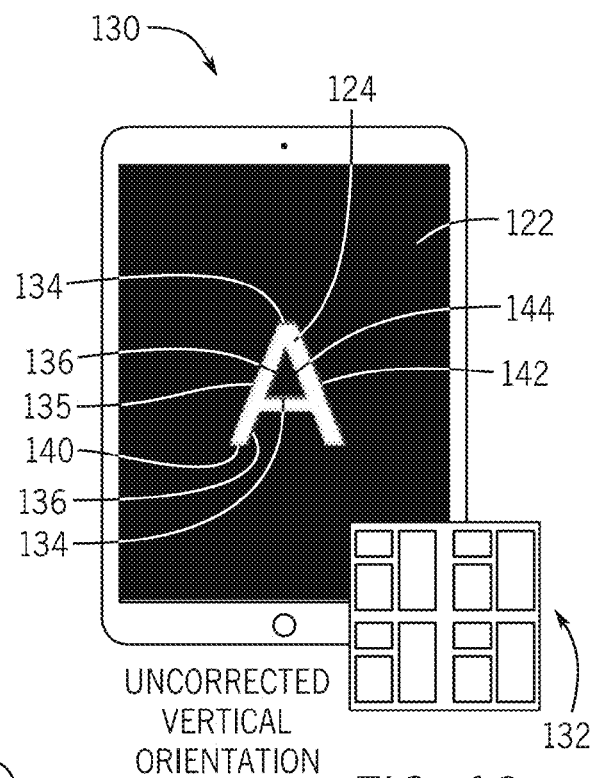
FIG. 10 is an example of an undesirable appearance of a first color fringing artifact when an uncorrected image is displayed on an electronic display in a first orientation, in accordance with an embodiment.

9-11 provide an illustration of this. FIG. 9 represents an ideal presentation 120 of an image with a black region 122 and a white region 124. The ideal presentation 120 of FIG. 9 may represent image data displayed on an ideal electronic display in which all of the subpixels of each pixel occupy the same spatial location. When the same image is displayed on an actual electronic display in uncorrected form, color fringing may result. For example, FIG. 10 shows an uncorrected vertical orientation presentation 130 of the image. In this case, the borders between the black region 122 and the white region 124 may have a first arrangement of color fringing artifacts because the electronic display may have a vertically oriented subpixel layout 132. This may produce magenta fringes 134, blue fringes 136, yellow fringes 138, aquamarine fringes 140, blue-magenta fringes 142, and yellow-green fringes 144 in certain specific areas of the image.

Figure 11:
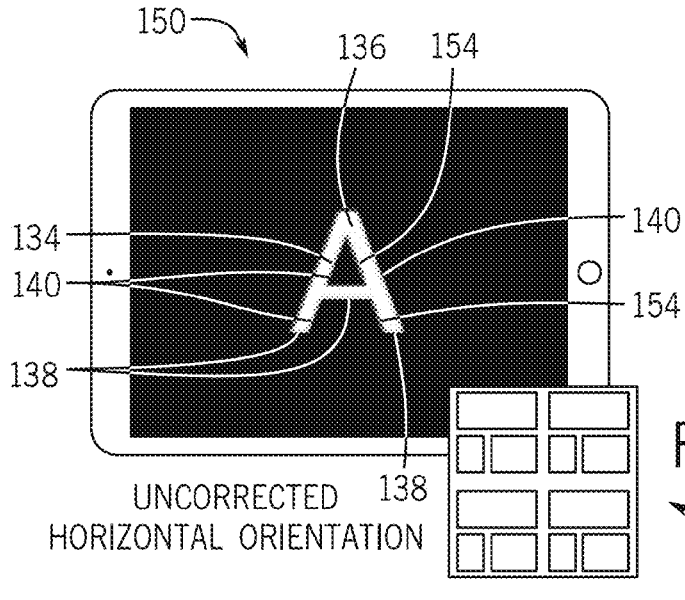
FIG. 11 is an example of an undesirable appearance of a second, different color fringing artifact when the uncorrected image is displayed on the electronic display in a second orientation, in accordance with an embodiment.

When the orientation of the electronic display changes, however, so will the appearance of the image, since the color fringe artifacts may also change. FIG. 11 shows an uncorrected horizontal orientation presentation 150 of the same image. In this case, the borders between the black region 122 and the white region 124 may have a different arrangement of color fringing artifacts because the electronic display now has a horizontally oriented subpixel layout 152. This may produce magenta fringes 134, blue fringes 136, yellow fringes 138, aquamarine fringes 140, as well as orange fringes 154 in different areas of the image in the uncorrected horizontal orientation presentation 150 as compared to the uncorrected vertical orientation presentation 130.

Figure 12:
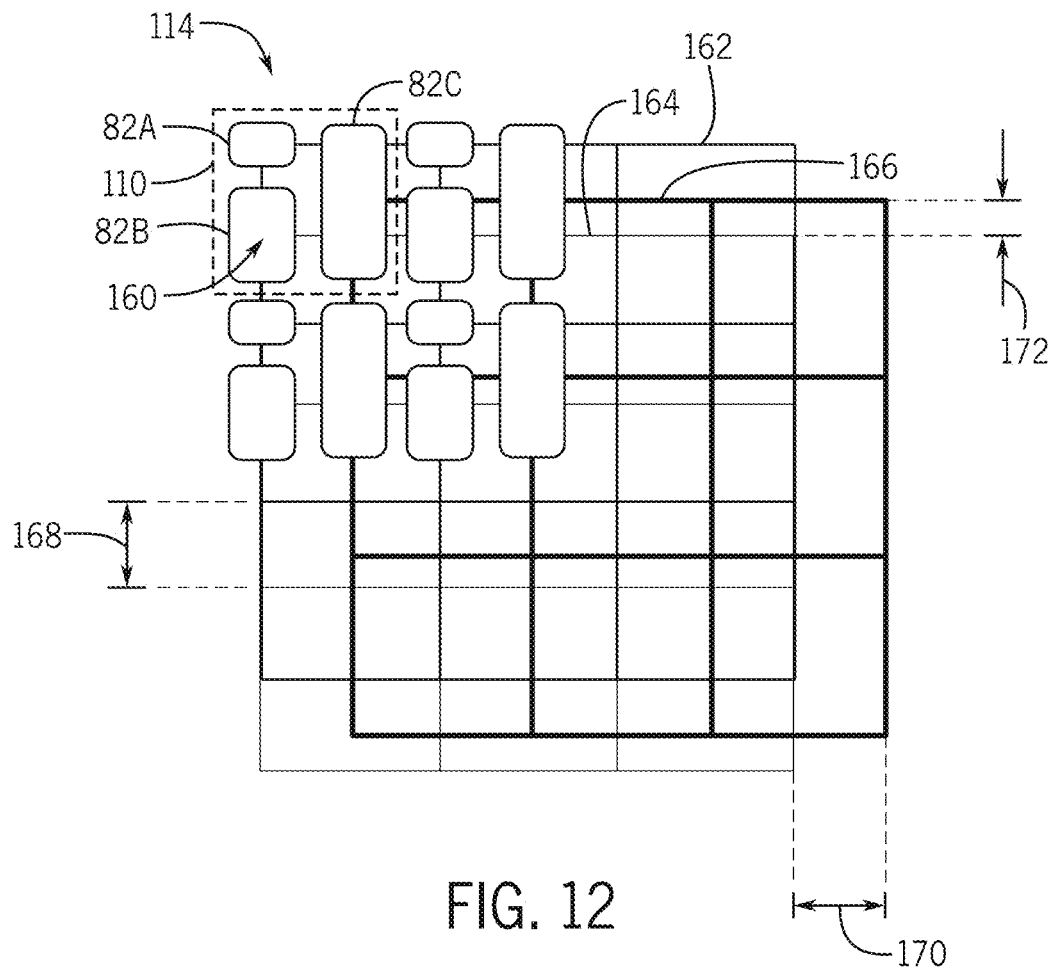
FIG. 12 is a diagram illustrating offsets of subpixels of a pixel in relation to a reference point in the pixel, in accordance with an embodiment.

These color fringe artifacts may be reduced or eliminated by considering the differences in subpixel location in pixels of an electronic display. First, the relative positions of the subpixels 82 in an actual subpixel layout 114 may be determined, as shown in FIG. 12. The actual subpixel layout 114 shown in FIG. 12 illustrates an example where there are three colors of subpixels 82 associated with each pixel 110, namely, a red subpixel 82A, a green subpixel 82B, and a blue subpixel 82C. In relation to a reference point 160, a red grid 162 maps the relative positions of the red subpixels 82A, a green grid 164 maps the relative positions of the green subpixels 82B, and a blue grid 166 maps the relative positions of the red subpixels 82A. In this example, the relative positions of the subpixels 82A, 82B, and 82C in relation to the reference point 160 may thus be defined. First, because the reference point 160 has been selected to be in the center of the green subpixel 82B, the relative position of the green subpixel 82B may be defined without offset from the reference point 160. The relative position of the red subpixel 82A may be defined by a vertical offset 168 in relation to the reference point 160 but no horizontal offset, since the red subpixel 82A is centered on the same horizontal position as the green subpixel 82B. The relative position of the blue subpixel 82C may be defined by a horizontal offset 170 and a vertical offset 172 in relation to the reference point 160.

FIG. 12 is meant to provide one example in which the relative positions of subpixels 82 may be defined in an area associated with a pixel 110. In this example, the reference point 160 was chosen to center on one of the subpixels 82 (here, the green subpixel 82B). Selecting the reference point 160 as a center of one of the subpixels 82 allows for more simple definition of the relative position of the subpixels 82, because at least the subpixel 82 that serves as the reference point 160 may be defined without any offsets. Indeed, in other examples the reference point 160 may be chosen on the red subpixel 82A or the blue subpixel 82C. Furthermore, as will be discussed below, the relative positions of the subpixels 82 may be accounted for by resampling the image data based at least in part on these offset values. Therefore, using a particular subpixel 82 as the reference point 160 may effectively cause that subpixel 82 to remain substantially unchanged in the resampling process. Here, because the green subpixel 82B has been chosen as the reference point 160, the green subpixel 82B will be substantially unchanged by the resampling process.

In still other examples, the reference point 160 may be located elsewhere in the area associated with the pixel 110. For example, the reference point 160 may be located at the center of the area associated with the pixel 110, a corner of the area associated with the pixel 110, or any other suitable location within or even outside of the area associated with the pixel 110.

Figure 13:
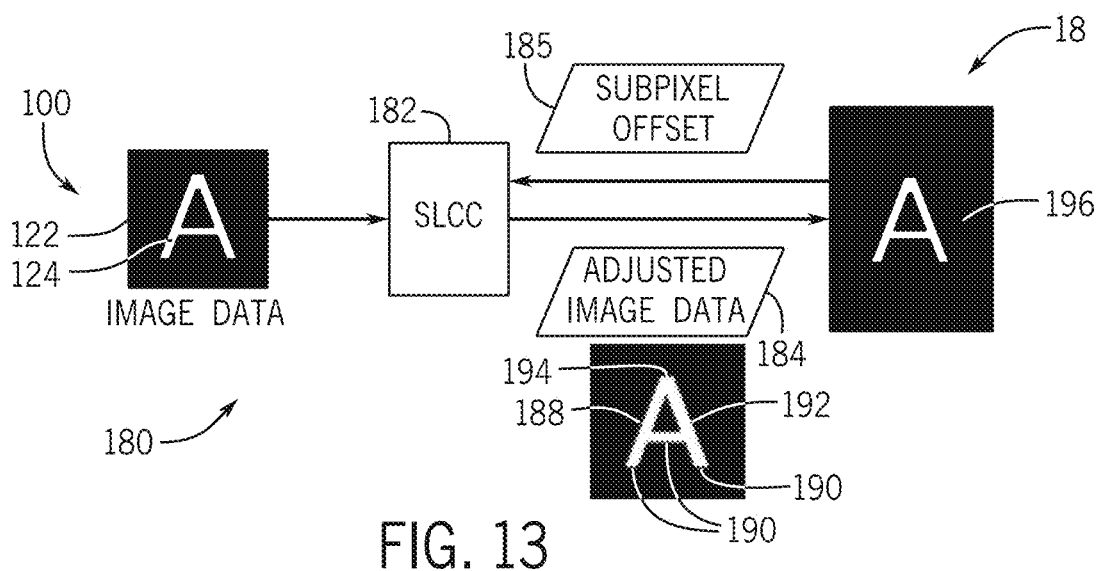
FIG. 13 is a block diagram of a subpixel layout compensation system for producing adjusted, compensated image data based on such subpixel offsets to reduce or eliminate a color fringing artifact, in accordance with an embodiment.

FIG. 13 illustrates a system 180 for compensating for color fringe artifacts due to subpixel layout. Subpixel layout compensation circuitry (SLCC) 182 may receive image data 100 that has been produced by the processor core complex 12, retrieved from the storage device(s) 14, and/or produced by a prior stage of image processing circuitry (e.g., a prior stage of a display pipeline). The image data 100 may have a format that assumes that all of the component colors for a pixel occupy the same spatial location in that pixel (e.g., as in the assumed subpixel layout 108 shown in FIG. 8). The subpixel layout compensation circuitry (SLCC) 182 may process the image data 100 to produce compensated image data 184 based at least in part on an indication of the spatial positions and/or spatial locations of the subpixels 82 in each pixel 110. For example, this may be done by resampling the image data 100 based at least in part on subpixel offsets 186 that define relative spatial positions and/or spatial locations of the subpixels 82 in each pixel 110, as will be discussed further below. The subpixel layout compensation circuitry (SLCC) 182 may represent any suitable hardware (e.g., specialized circuitry), software (e.g., instructions running on the processor core complex 12 or other processing circuitry), or a combination of hardware and software, that can produce the compensated image data 184 using image resampling, an example of which will be discussed further below.

The indication of subpixel offsets 186 are shown here to be received from the electronic display 18 (e.g., from storage located on the electronic display 18). The subpixel offsets 186 may be programmed into the electronic display 18 during manufacturing. This may allow the subpixel layout compensation circuitry (SLCC) 182 to be able to operate independent of the particular electronic display 18, as long as that electronic display 18 can provide an indication of the subpixel offsets 186 associated with that electronic display 18. For example, if the electronic display 18 is an external monitor that is coupled to the electronic device 10, the subpixel layout compensation circuitry (SLCC) 182 may be able to compensate the image data 100 for display on the external monitor. If the electronic display 18 is permanently affixed to the electronic device 10 in the manufacturing process, the electronic device 10 may be able to be manufactured with different types of electronic displays 18 with different subpixel layouts (e.g., from different manufacturers). Additionally or alternatively, the indication of the subpixel offsets 186 may be stored in other memory on the electronic device 10, such as in the storage device(s) 14 (e.g., when the electronic display 18 is coupled to other components of the electronic device 10 in the manufacturing process).

Before continuing, it may be noted that, if the image data 100 were displayed on the electronic display 18, which has an actual subpixel layout in which subpixels occupy different relative spatial locations in the respective pixels, color fringing artifacts would result. By contrast, if the compensated image data 184 were displayed on an ideal electronic display having subpixels that shared the exact same position in each pixel, it would appear to have countervailing color fringing artifacts. In other words, the subpixel layout compensation circuitry (SLCC) 182 effectively introduces countervailing color fringing artifacts, a countervailing in the compensated image data 184, which when displayed on the electronic 18 are canceled out, resulting in an image with reduced or eliminated color fringing. In the example of FIG. 13, the image data 100 is shown to have the black region 122 and the white region 124 as discussed in the examples above. When the subpixel layout compensation circuitry (SLCC) 182 resamples the image data 100 to produce the compensated image data 184, it may be visualized as containing countervailing blue fringes 188 (as compared to the yellow fringes 138 shown in FIG. 10), magenta fringes 190 (as compared to the aquamarine fringes 140 shown in FIG. 10), yellow-green fringes 192 (as compared to the blue-magenta fringes 142 shown in FIG. 10), and blue fringes 194 (as compared to the magenta fringes 134 shown in FIG. 10). When the compensated image data 184 is displayed on the electronic display 18, a resulting displayed image 196 may have fewer, or may be substantially free of, color fringing artifacts that would otherwise have occurred if the image data 100 were displayed on the electronic display 18 without compensation.

By relying on the indication of the subpixel offsets 186 to compensate the image data 100 for the electronic display 18, the subpixel layout compensation circuitry (SLCC) 182 may avoid complicated frequency analyses or gradient calculations. Indeed, the subpixel layout compensation circuitry (SLCC) 182 may apply this compensation to the image data 100 regardless of the particular content in the image data 100. The subpixel layout compensation circuitry (SLCC) 182 may perform any suitable resampling on the image data 100 to address the subpixel layout of the electronic display using the indication of the subpixel offsets 186.

Figure 14:
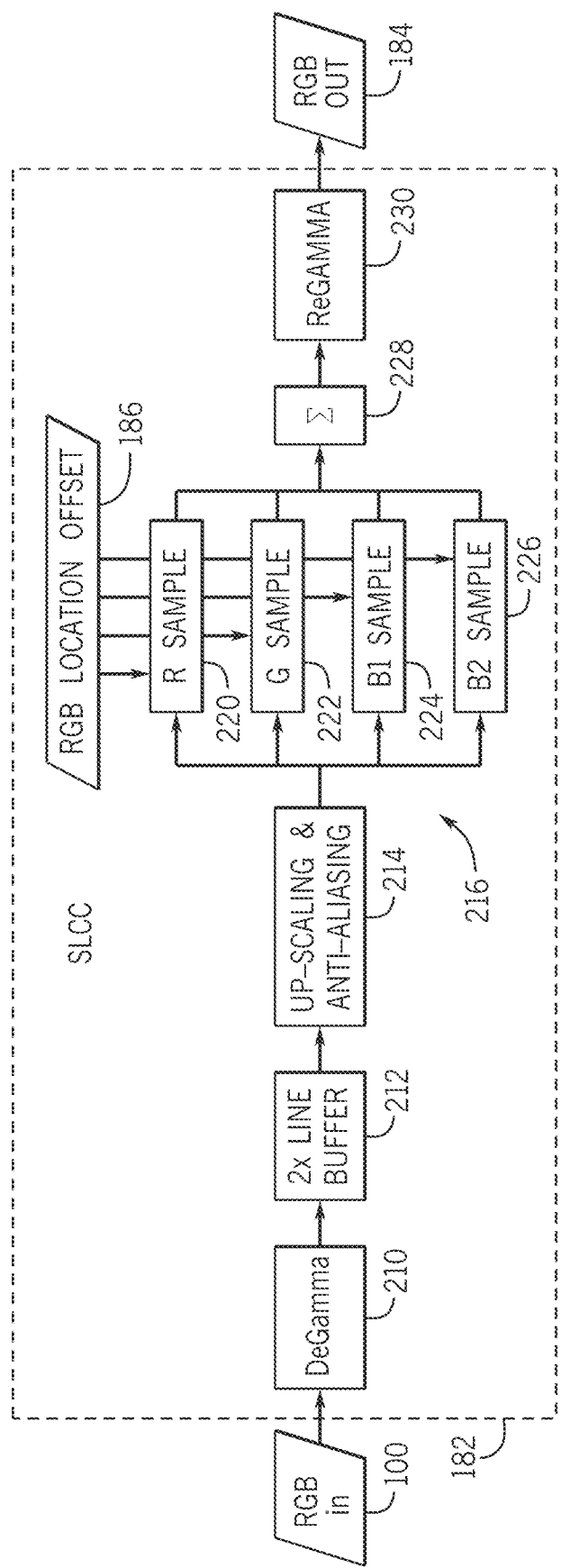
FIG. 14 is a block diagram illustrating an example of subpixel layout compensation circuitry of the system of FIG. 13, in accordance with an embodiment.
Figures 15, 16:
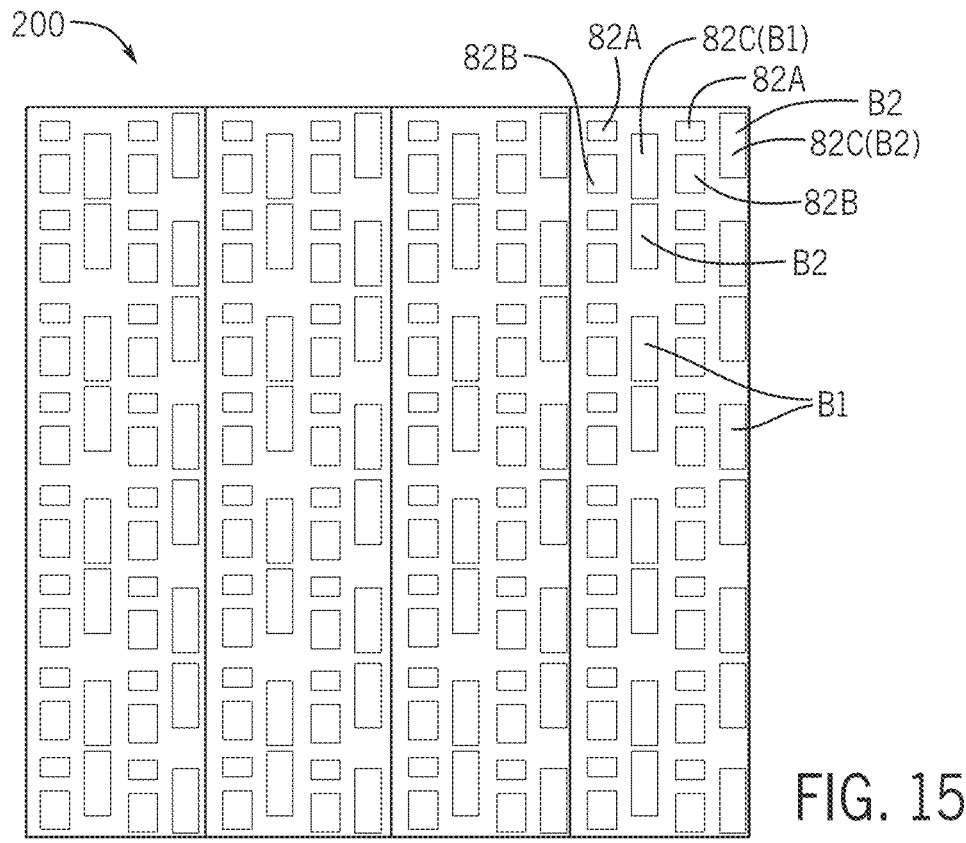
FIG. 15 is an example subpixel layout for an array of pixels, in accordance with an embodiment.
FIG. 16 is a table illustrating a resampling method of compensating the image data to account for the example subpixel layout of FIG. 15.

One example operation of the subpixel layout compensation circuitry (SLCC) 182 is shown in FIG. 14. By way of example, the subpixel layout compensation circuitry (SLCC) 182 of FIG. 14 will be described as compensating image data 100 for display on an electronic display having a subpixel layout 200 as shown in FIG. 15. The subpixel layout 200 has alternating arrangements of subpixels 82 associated with adjacent pixels 110. In particular, while red subpixels 82A and green subpixels 82B remain in the same position, the blue subpixels 82C occupy one of two different positions. It should be understood that this subpixel layout 200 is provided by way of example and is not intended to be limiting. Indeed, the subpixel layout compensation circuitry (SLCC) 182 may accommodate any other suitable subpixel arrangement, including those that have multiple subpixels 82 of the same color within the same area associated with a pixel, as well as those that have a variety of arrangements of subpixels for different areas associated with a pixel, provided the indication of subpixel offsets 186 identifies the locations of those different arrangements.

Returning to consider FIG. 14, the subpixel layout compensation circuitry (SLCC) 182 receives the image data 100 from the processor core complex 12, from the storage device(s) 14, and/or from a prior stage of image processing circuitry (e.g., a prior stage of a display pipeline). Here, the image data 100 is shown in RGB format, which may be in a gamma domain for display on the electronic display 18. The subpixel layout compensation circuitry (SLCC) 182 may receive the image data 100 on a pixel-by-pixel basis, where each pixel of the image data may be understood to correspond to a two-dimensional array, and therefore individual pixels may be defined by x and y coordinates (x, y). The subpixel layout compensation circuitry (SLCC) 182 may DeGamma (block 210) the image data 100 to transform the image data 100 out of the gamma domain and into a linear domain. Subsequent calculations in the subpixel layout compensation circuitry (SLCC) 182 may take place in the linear domain. The image data 100 may be temporarily stored in any suitable number of line buffers (block 212). In the example shown in FIG. 14, two lines of image data 100 may be stored, but other numbers of lines may be stored in other examples. For instance, in another example, resampling may consider a 5×5 neighborhood around the resampled pixel; in that case, five lines of image data 100 may be stored. In another example, resampling may consider a 3×3 neighborhood around the resampled pixel; in that case, three lines of image data 100 may be stored. In still another example, resampling may be one-dimensional and may consider the pixels of a single line; in that case, one line of image data 100 may be stored. Indeed, depending on the type of resampling (and/or other operations, such as up-scaling or anti-aliasing) to be performed, any suitable number of line buffers may be used.

If desired, up-scaling and/or anti-aliasing (block 214) may be performed on the image data that has been stored in the line buffers using any suitable up-scaling and/or anti-aliasing technique. Whether to perform up-scaling and/or anti-aliasing (block 214) may be controlled to depend on a relative resolution of the input image data 100 to a native resolution of the electronic display 18. In one example, if the input image data 100 has a higher resolution than the native resolution of the electronic display 18, up-scaling and/or anti-aliasing (block 214) may be bypassed and resampling may take place at the resolution of the input image data 100. If the input image data 100 has a resolution that is at or below the native resolution of the electronic display 18, up-scaling and/or anti-aliasing (block 214) may allow the resampling more effectively retain the image information of the image data 100 during resampling. The resampling process may therefore, in some cases, involve performing a weighted average of the subpixels. In other cases, even if the input image data 100 has a higher resolution than the native resolution of the electronic display 18, up-scaling and/or anti-aliasing (block 214) may still take place. This may be useful, for example, when the resolution of the image data 100 is greater than the native resolution of the electronic display 18, but less than some threshold level of resolution that would allow more of the image content information of the image data 100 to be extracted (e.g., less than 2× the native resolution, less than 4× the native resolution) upon resampling.

Resampling 216 may involve redefining the image content of each color component of each pixel, corresponding to each subpixel of each pixel of the electronic display 18, based on the actual spatial location of the subpixels of the electronic display 18. The actual spatial location of the subpixels may be defined by the indication of the subpixel offsets 186, which may be received into the subpixel layout compensation circuitry (SLCC) 182 from the electronic display 18 or storage device(s) 14 located elsewhere in the electronic device (e.g., separate from the electronic display 18). A table 218 shown in FIG. 16 represents one specific example of resampling that may take place for a particular set of subpixel offsets 186, corresponding to the subpixel layout 200 of FIG. 15.

In the table 218 of FIG. 16, each color component (R, G, and B1 or B2) corresponding to subpixels 82A, 82B, 82C (B1) or 82C(B2) of each pixel 110 is resampled to obtain the compensated image data 184. According to the table of FIG. 16, the color components of each pixel of the output compensated image data 184 may take the following forms. In this particular example, resampling the red component (resampling block 220) of the pixel (x, y) of the image data 100 (in its original resolution form or after up-scaling and/or anti-aliasing, depending on whether these additional operations have been performed) may take place as follows:

$$R\_OUT(x,y) = (WR_{11}*(R\_IN(x,y)^{2.2}) + WR_{12}*(R\_IN(x+1,y)^{2.2}) + WR_{21}*(R\_IN(x,y+1)^{2.2}) + WR_{22}*(R\_IN(x+1,y+1)^{2.2}))^{(1/2.2)};$$

$$WR = [0.5\ 0.0;\ 0.5\ 0.0]$$

Above, R_OUT(x, y) represents the red component at pixel (x, y) of the compensated image data 184 that has been corrected to reduce or eliminate color fringing due to the spatial positions of the red subpixels 82A. The variable R_IN(x, y) represents the red component at pixel (x, y) of the image data 100 (in its original resolution form or after up-scaling and/or anti-aliasing, depending on whether these additional operations have been performed). Thus, the variable R_IN(x+1, y) represents the red component of the pixel located directly to the right of the pixel (x, y) of the image data 100, the variable R_IN(x, y+1) represents the red component of the pixel located directly above the pixel (x, y) of the image data 100, and the variable R_IN(x+1, y+1) represents the red component of the pixel located up and to the right of the pixel (x, y) of the image data 100. As may be appreciated, this is meant to represent only one set of pixels that may be used to perform resampling, since resampling may additionally or alternatively take place using any other suitable pixels around the input pixel R_IN(x, y). Indeed, in one example, the x or y offset direction may be programmable so that input pixels to the left rather than to the right, and/or below rather than above the (x, y) input pixel are selected (e.g., R_IN(x, y−1) and/or R_IN(x, y+1)). Moreover, more or fewer pixels located around the input pixel R_IN(x, y) may be used to perform resampling.

The variable WR represents a matrix that defines the relative offset positions of red subpixels 82A in relation to the reference point 160 of each pixel 110 (here, the reference point 160 may be akin to that shown in FIG. 12, which uses the center of the green subpixel 82B as the reference point 160). In the example above, the relative offset positions are defined in terms of fractions of the pixel 110. That is, 0.5 means that the red subpixel 82A is offset from the reference point 160 at the center of the green subpixel 82B by half of the size of the pixel 110. The number 2.2 appears in the equations above in connection with performing DeGamma and Gamma, but it should be appreciated that other DeGamma and Gamma values may be used.

Resampling the green component at pixel (x, y) of the image data 100 (resampling block 222) in accordance with the particular example of FIG. 16 may be much simpler. This is because the reference point 160 that defines the subpixel offsets 186 has been chose to center on the green subpixel 82B. Thus, the green subpixel 82B may be resampled as follows:

$$G\_OUT(x,y) = G\_IN(x,y)$$

Above, G_OUT(x, y) represents the green component at pixel (x, y) of the compensated image data 184 that has been corrected to reduce or eliminate color fringing due to the spatial positions of the green subpixels 82B. The variable G_IN(x, y) represents the green component at pixel (x, y) of the image data 100 (in its original resolution form or after up-scaling and/or anti-aliasing, depending on whether these additional operations have been performed). Thus, since the reference point 160 defining the subpixel offsets has been chosen to center on the green subpixel 82B, resampling the green subpixel 82B means the output green component of the pixel (x, y) of the compensated image data 184 may be substantially unchanged from the input green component of the pixel (x, y) of the image data 100. This may also preserve edge sharpness for the green color component.

Resampling the blue component at pixel (x, y) of the image data 100 under the example of FIG. 16 may involve different calculations depending on whether a pixel 110 has a first arrangement (e.g., includes the blue subpixel 82C in position B1) (resampling block 224) or a second arrangement (e.g., includes the blue subpixel 82C in position B2) (resampling block 226). Resampling for the first arrangement that includes the blue subpixel 82C in position B1 may take place according to the following relationships:

$$B1\_OUT(x,y) = (WB1_{11}*(B1\_IN(x,y-1)^{2.2}) + WB1_{12}*(B1\_IN(x+1,y-1)^{2.2}) + WB1_{21}*(B1\_IN(x,y)^{2.2}) + WB1_{22}*(B1\_IN(x+1,y)^{2.2}))^{(1/2.2)};$$

$$WB1 = [0.05\ 0.05;\ 0.45\ 0.45]$$

$$B2\_OUT(x,y) = (WB2_{11}*(B1\_IN(x,y-1)^{2.2}) + WB2_{12}*(B1\_IN(x+1,y-1)^{2.2}) + WB2_{21}*(B1\_IN(x,y)^{2.2}) + WB2_{22}*(B1\_IN(x+1,y)^{2.2}))^{(1/2.2)};$$

$$WB2 = [0.25\ 0.25;\ 0.25\ 0.25]$$

Above, B1_OUT(x, y) represents the blue component at pixel (x, y) of the compensated image data 184 that has been corrected to reduce or eliminate color fringing due to the spatial positions of the blue subpixels 82C when the blue subpixels 82C are in the first arrangement (e.g., position B1). The variable B2_OUT(x, y) represents the blue component at pixel (x, y) of the compensated image data 184 that has been corrected to reduce or eliminate color fringing due to the spatial positions of the blue subpixels 82C when the blue subpixels 82C are in the second arrangement (e.g., position B2). In this example, blue subpixels 82C are in the first arrangement (e.g., position B1) when the row of the pixel being processed by the subpixel layout compensation circuitry (SLCC) 182 is equal to the column number of the pixel (x[0]=y[0]). The blue subpixels 82C are in the second arrangement (e.g., position B2) when the row of the pixel being processed by the subpixel layout compensation circuitry (SLCC) 182 is not equal to the column number of the pixel (x[0] y[0]).

The variables B1_IN(x, y) or B2_IN(x, y) represent the blue component at pixel (x, y) of the image data 100 (in its original resolution form or after up-scaling and/or anti-aliasing, depending on whether these additional operations have been performed). Thus, the variables B1_IN(x, y−1) or B2_IN(x, y−1) represent the blue component of the pixel located directly to the below the pixel (x, y) of the image data 100, the variables B1_IN(x+1, y−1) or B2_IN(x+1, y−1) represent the blue component of the pixel located below and to the right of the pixel (x, y) of the image data 100, and the B1_IN(x+1, y) or B2_IN(x+1, y) represent the blue component of the pixel located directly to the right of the pixel (x, y) of the image data 100. As may be appreciated, this is meant to represent only one set of pixels that may be used to perform resampling, since resampling may additionally or alternatively take place using any other suitable pixels around the input pixel B1_IN(x, y) or B2_IN (x, y). Indeed, in one example, the x or y offset direction may be programmable so that input pixels to the left rather than to the right, and/or above rather than below the (x, y) input pixel are selected (e.g., B1_IN(x, y−1) and/or B1_IN(x, y+1)). Moreover, more or fewer pixels located around the input pixel B1_IN(x, y) or B2_IN(x, y) may be used to perform resampling.

The variable WB1 represents a matrix that defines the relative offset positions of blue subpixels 82C in the B1 position in relation to the reference point 160 of each pixel 110 (here, the reference point 160 may be akin to that shown in FIG. 12, which uses the center of the green subpixel 82B as the reference point 160). The variable WB2 represents a matrix that defines the relative offset positions of blue subpixels 82C in the B2 position in relation to the reference point 160 of each pixel 110. In the example above, the relative offset positions are defined in terms of fractions of the pixel 110. That is, 0.25 means that the blue subpixel 82C is offset from the reference point 160 at the center of the green subpixel 82B by a quarter of the size of the pixel 110, and so forth. The number 2.2 appears in the equations above in connection with performing DeGamma and Gamma, but it should be appreciated that other DeGamma and Gamma values may be used.

The resampled color components from the red resampling block 220, the green resampling block 222, and the blue (B1) resampling block 224 or the blue (B2) resampling block 226 may be recombined in a combination block 228 and ReGamma 230 may convert the resulting resampled image data into the gamma domain. The resulting compensated image data 184 may reduce or eliminate color fringing artifacts when displayed on the electronic display 18.

Figure 17:
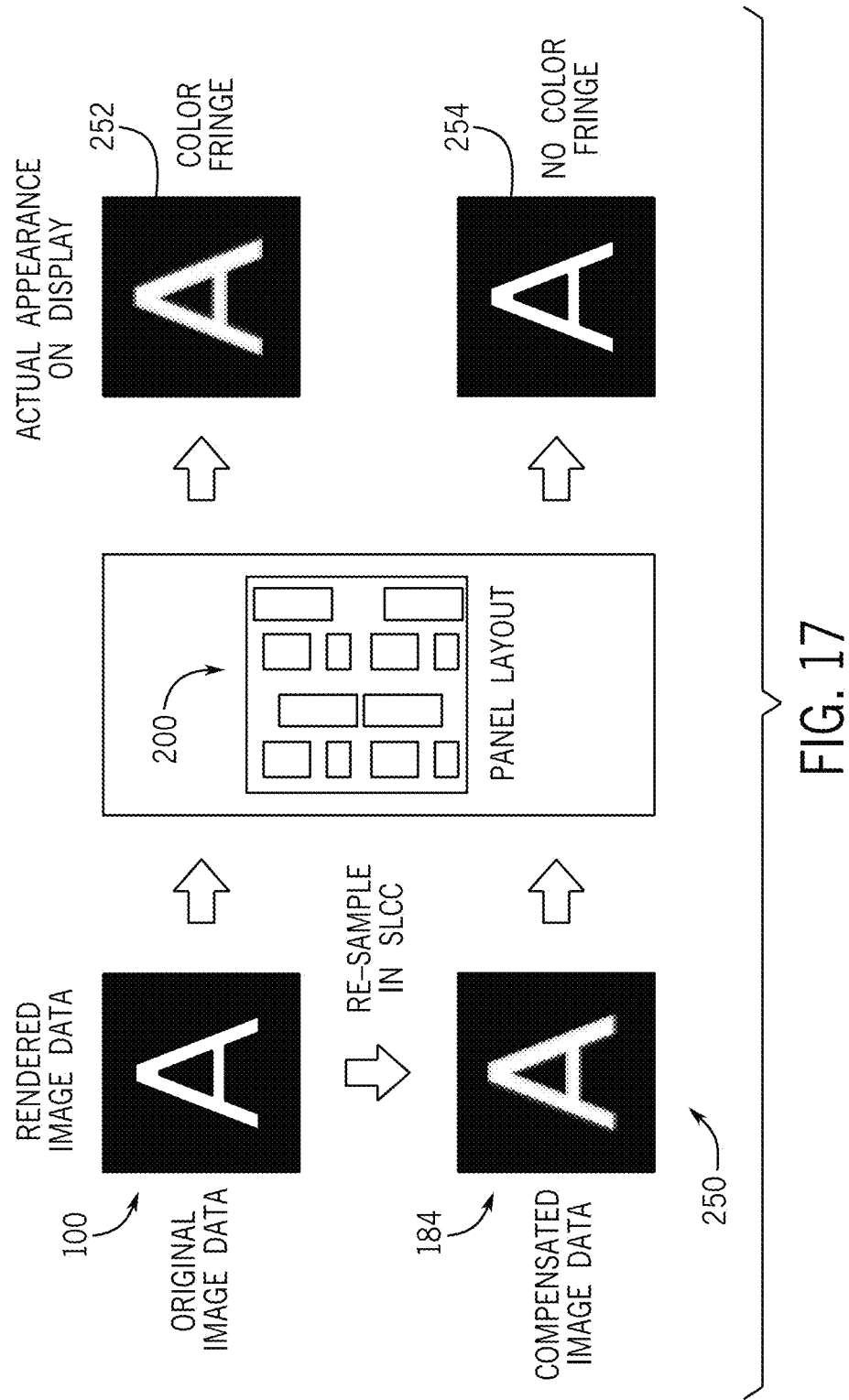
FIG. 17 illustrates an effect of using as compared to not using the subpixel layout compensation system to generate compensated image data for display on an electronic display, thereby reducing or eliminating a color fringing artifact, in accordance with an embodiment.

Again, the subpixel arrangement discussed above has been provided by way of example. Indeed, any suitable subpixel arrangement(s) may be used. In any event, as summarized in FIG. 17, image data 100 that has been defined according to a format whereby color components are assumed to have a first spatial relationship (e.g., all color components are assumed to have the same spatial location in the pixel, or the color components are assumed to have a different spatial arrangement than those of the electronic display 18) may be resampled to generate compensated image data 184 that accounts for a second, actual spatial arrangement of subpixels of the electronic display 18.

If the original image data 100 were displayed on an actual subpixel layout on an electronic display, such as the subpixel layout 200, the actual appearance on the electronic display may be an image 252 that has color fringe artifacts. By contrast, when the compensated image data 184 is displayed on an actual subpixel layout on an electronic display, such as the subpixel layout 200, the actual appearance on the electronic display may be an image 254 that has fewer or no color fringe artifacts. Moreover, the subpixel layout compensation circuitry (SLCC) of this disclosure may obtain the compensated image data 184 independent of image content. For example, the subpixel layout compensation circuitry (SLCC) may obtain the compensated image data 184 without performing a spatial frequency analysis of the image data 100, without identifying edges in the image data 100, and/or without calculating or identifying gradients in the image data 100. This may vastly simplify obtaining the compensated image data 184 while being independent of image content. Furthermore, the subpixel layout compensation circuitry (SLCC) may be independent of the particular subpixel layout of electronic displays, provided the subpixel layout compensation circuitry (SLCC) can be provided with information that defines the subpixel layouts (e.g., an indication of subpixel offsets from storage on the electronic display).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. An electronic device comprising:
    an electronic display comprising a plurality of pixels, wherein:
        each pixel of a first portion of the plurality of pixels of the electronic display comprises a first respective plurality of subpixels having a same first set of spatial positions;
        each pixel of a second portion of the plurality of pixels of the electronic display comprises a second respective plurality of subpixels having a same second set of spatial positions, wherein the second set of spatial positions differs from the first set of spatial positions for at least one subpixel; and
        at least two subpixels within each respective pixel of the plurality of pixels differ in size and shape from each other within the respective pixel; and
    image processing circuitry comprising subpixel layout compensation circuitry, wherein the subpixel layout compensation circuitry is configured to:
        receive first image data and an indication of spatial positions of subpixels within a first pixel of the first portion of the plurality of pixels and a second pixel of the second portion of the plurality of pixels, wherein the indication of spatial positions of the subpixels, for each respective pixel of the first pixel and the second pixel, comprises a vertical or horizontal offset of at least one of the subpixels from a reference point within the respective pixel; and
        generate second image data based at least in part on the first image data and the indication of the spatial positions of the subpixels;
    wherein the electronic display is configured to display the second image data, and wherein the second image data reduces or eliminates a color fringing artifact that would otherwise occur if the first image data were displayed on the electronic display due to the spatial positions of the subpixels.

2. The electronic device of claim 1, wherein the electronic display is configured to store the indication of the spatial positions of the subpixels and provide the indication of the spatial positions of the subpixels to the image processing circuitry.

3. The electronic device of claim 1, comprising memory external to the electronic display, wherein the memory is configured to store the indication of the spatial positions of the subpixels, wherein the image processing circuitry is configured to obtain the indication of the spatial positions of the subpixels from the memory.

4. The electronic device of claim 1, wherein the image processing circuitry is configured to generate the second image data at least in part by resampling the first image data using the indication of the spatial positions of the subpixels.

5. The electronic device of claim 1, wherein:
the subpixels within each pixel of the plurality of pixels comprise at least three single-color subpixels configured to emit different colors of light.

6. The electronic device of claim 5, wherein:
the at least three single-color subpixels comprise a red subpixel, a green subpixel, and a blue subpixel; and
the reference point is located within one of the at least three single-color subpixels.

7. The electronic device of claim 6, wherein the one of the at least three single-color subpixels comprises the red subpixel or the green subpixel.

8. The electronic device of claim 1, wherein the at least one subpixel comprises a blue subpixel.

9. The electronic device of claim 1, wherein the image processing circuitry is configured to convert the first image data from a gamma domain to a linear domain, wherein the subpixel layout compensation circuitry is configured to process the first image data in the linear domain to generate the second image data in the linear domain before the second image data is converted into the gamma domain.

10. The electronic device of claim 1, wherein the electronic device comprises a computer, a mobile phone, a portable media device, a tablet, a television, a virtual-reality headset, or a vehicle dashboard.

11. Image processing circuitry comprising:
prior image processing circuitry configured to produce first image data before the first image data is received by subpixel layout compensation circuitry, wherein the first image data comprises an array of pixels each having a respective plurality of color channels, wherein each of the plurality of color channels for each pixel is defined as occupying the same spatial position within the pixel; and
subpixel layout compensation circuitry configured to resample the first image data to produce second image data that maps image content of the first image data to a corresponding array of second pixels of an electronic display, wherein:
the second pixels comprise subpixels, each of which corresponds to one of the color channels,
at least two subpixels within each respective second pixel differ in size and shape from each other within the respective second pixel;
each second pixel of a first portion of the second pixels comprises subpixels arranged in a first pattern; and
each second pixel of a second portion of the second pixels comprises subpixels arranged in a second pattern that is different than the first pattern;
the subpixel layout compensation circuitry is configured to resample the second image data based at least in part on an indication of spatial locations of the subpixels within each second pixel of the electronic display to enable the second image data to be displayed on the electronic display; and
the indication of spatial locations comprises vertical or horizontal offsets of two subpixels of a particular second pixel from a reference point within the particular second pixel.

12. The image processing circuitry of claim 11, wherein:
if the first image data were displayed on the electronic display, an image would appear on the electronic display having a color fringe artifact; and
when the second image data is displayed on the electronic display, the image appears on the electronic display without the color fringe artifact or with a substantially reduced color fringe artifact.

13. The image processing circuitry of claim 11, wherein the subpixel layout compensation circuitry is configured to use no more than two line buffers to store lines of the first image data while resampling any one of each pixel of the first image data to obtain the second image data.

14. The image processing circuitry of claim 11, wherein the subpixel layout compensation circuitry is configured to use no more than three line buffers to store lines of the first image data while resampling any one of each pixel of the first image data to obtain the second image data.

15. The image processing circuitry of claim 11, wherein the subpixel layout compensation circuitry is configured to use no more than five line buffers to store lines of the first image data while resampling any one of each pixel of the first image data to obtain the second image data.

16. The image processing circuitry of claim 11, wherein the subpixel layout compensation circuitry is configured to up-scale the first image data before resampling the first image data.

17. The image processing circuitry of claim 16, wherein:
when a resolution of the first image data is less than a first threshold, the subpixel layout compensation circuitry is configured to up-scale the first image data before resampling the first image data; and
when the resolution of the first image data is not less than the first threshold, the subpixel layout compensation circuitry is configured not to up-scale the first image data before resampling the first image data.

18. The image processing circuitry of claim 11, wherein the subpixel layout compensation circuitry is configured to anti-alias the first image data before resampling the first image data.

19. A method comprising:
receiving first image data into image processing circuitry, wherein:
the first image data is configured not to appear to have a first color fringe visual artifact were the first image data displayed on a first electronic display having first pixels, wherein each first pixel comprises first subpixels arranged in a first pattern; and
the first image data is configured to appear to have the first color fringe visual artifact were the first image data displayed on a second electronic display having second pixels, wherein:
at least two subpixels within each respective second pixel differ in size and shape from each other within the respective second pixel;
each second pixel of a first portion of the second pixels comprises second subpixels arranged in a second pattern that is different than the first pattern; and
each second pixel of a second portion of the second pixels comprises second subpixels arranged in a third pattern that is different than the first pattern and the second pattern;

receiving an indication of subpixel offsets into the image processing circuitry, wherein the indication of subpixel offsets defines positions of one or more second subpixels within a same pixel of the second pixels of the second electronic display relative to a reference point within the same pixel;

generating, using the image processing circuitry, second image data using the first image data and the indication of subpixel offsets, wherein the second image data is configured not to have the first color fringe visual artifact or configured to have a reduced form of the first color fringe visual artifact when displayed on the second electronic display; and displaying the second image data on the second electronic display without the first color fringe visual artifact or with the reduced form of the first color fringe visual artifact.

20. The method of claim 19, wherein the indication of subpixel offsets is received from the second electronic display.

\* \* \* \* \*